April 9, 1963 A. L. STUCHBERY 3,084,382
MANUFACTURE OF HOLLOW ARTICLES
Filed Oct. 25, 1960 3 Sheets-Sheet 1
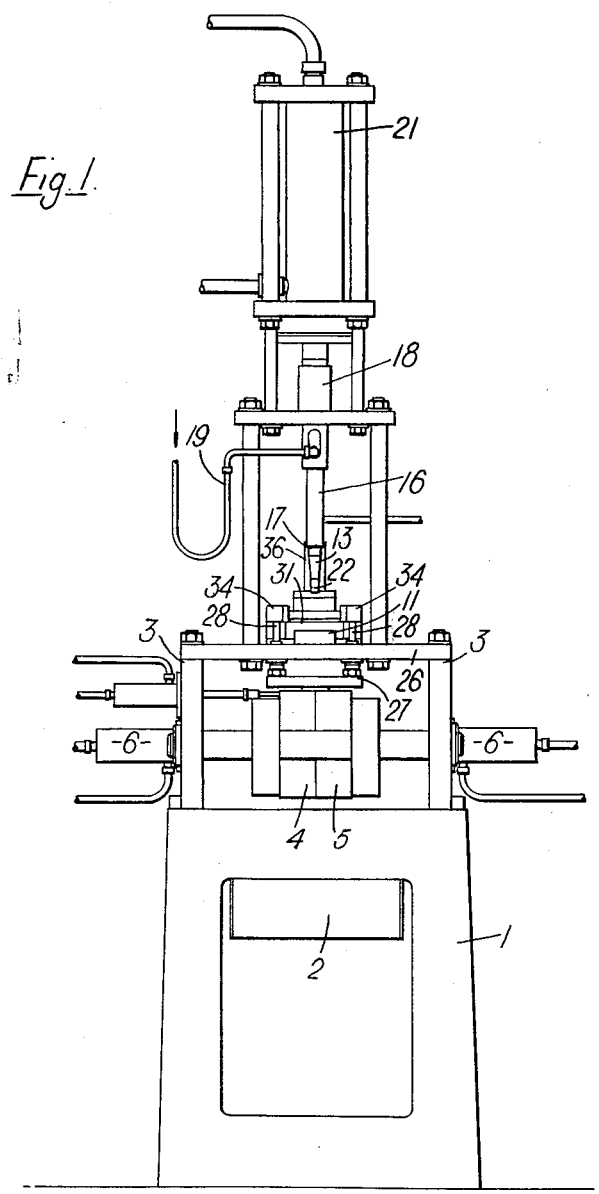
Inventor
ARTHUR L. STUCHBERY
By
Attorney

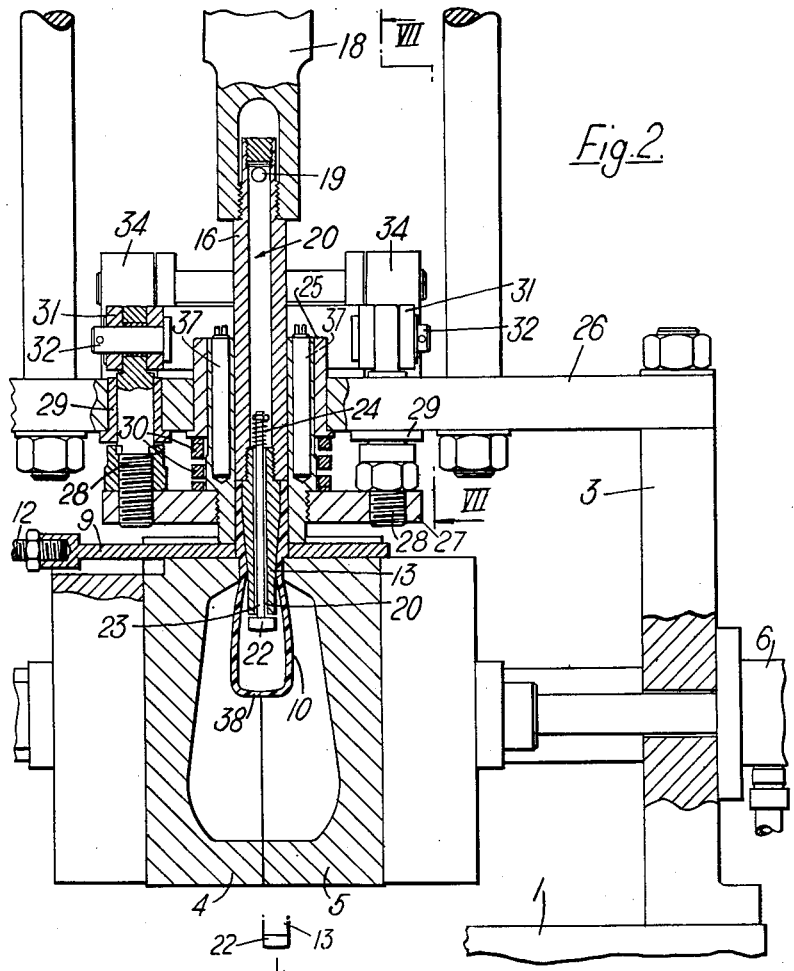

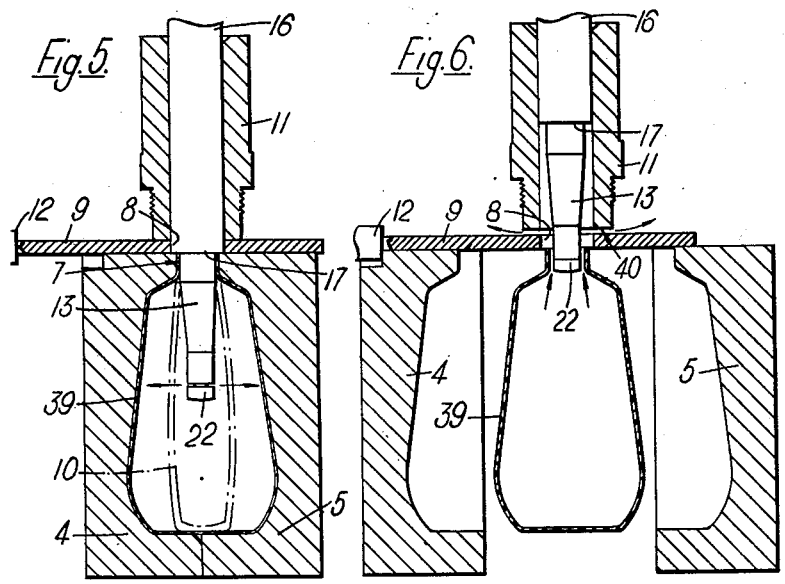
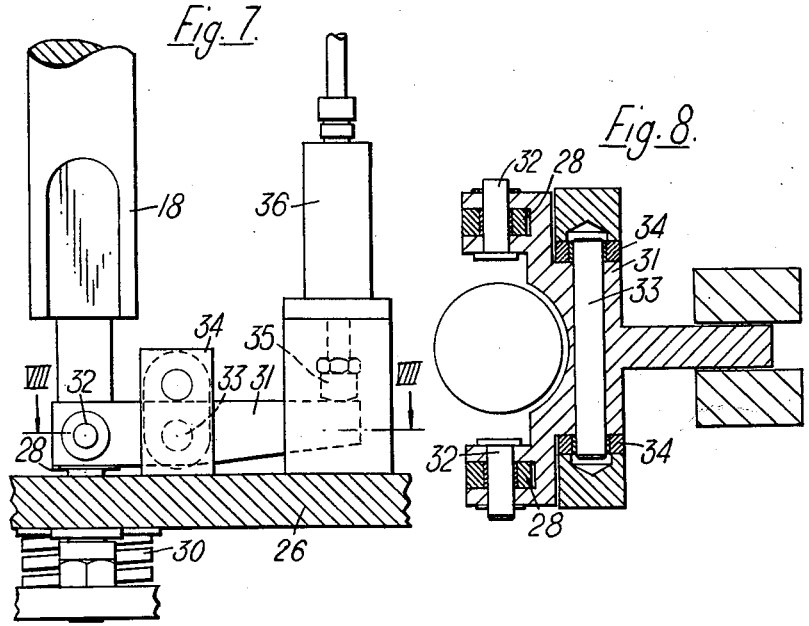

United States Patent Office 3,084,382
Patented Apr. 9, 1963

3,084,382
MANUFACTURE OF HOLLOW ARTICLES
Arthur Leslie Stuchbery, Enfield, England, assignor to The Metal Box Company Limited, London, England, a British company
Filed Oct. 25, 1960, Ser. No. 64,823
Claims priority, application Great Britain Nov. 9, 1959
15 Claims. (Cl. 18—5)

This invention relates to the manufacture of hollow articles from thermoplastic material such as polyethylene, cellulose esters, polyvinyl chloride, or polystyrene.

It has been proposed to manufacture hollow articles, such as bottles, from thermoplastic material by extruding molten material as a tube and, after enclosing a length of the tube in a sectional mould, blowing the enclosed tube length to the shape of the interior of the mould either through the upper or the lower end of the mould. With these known processes, however, there is, in general, a considerable wastage of material because it is necessary at least at one end of the tube to effect nipping thereof by the mould to effect closing of a tube end prior to blowing and this results in the formation of a "flash" of waste materal which must be removed from the formed articles after removal thereof from the mould. Further, when blowing is effected through the bottom of a mould it is necessary to take steps to ensure that the leading end of a tube length is an open end following the clamping of the preceding tube length in the mould.

It has also been proposed to manufacture hollow articles, such as bottles, from thermoplastic material by inserting a hollow mandrel into the mould of an injection moulding machine and moulding a parison about the end of the mandrel, the mandrel and parison being thereafter removed from the injection mould and transferred to a further mould in which fluid under pressure is introduced through the mandrel to effect expansion of the parison to conform it to the shape of the interior of the second mould. By this proposal the above-mentioned wastage does not occur but the removal of the parison from one mould to another effects a cooling of the parison which entails the heating of the second mould. Further, in an automatic machine means must be provided for effecting the transfer of mandrel and parison from one mould to another.

It is an object of the present invention to provide a method of and apparatus for forming hollow articles from thermoplastic material which avoids undue wastage of material and the necessity for removing excessive "flashes" of waste material from the articles and which permits formation of an article without the transfer of a mandrel and parison from one mould to another.

According to the present invention there is provided the method of manufacturing a hollow article by feeding a slug of softened thermoplastic material to a parison-forming mould, penetrating the slug with a hollow core while restricting the slug against displacement in the direction of penetration of the core thereby to produce a closed end parison surroundng the core, removing said restriction and displacing the core and parison axially through an orifice of lesser cross-sectional area than that of the smallest cross-sectional dimension of the parison directly into a closed sectional blow-mould thereby to extrude into the blow-mould a closed end preform having walls of lesser thickness than that of the parison, and introducing pressurised fluid through the core to expand the preform and conform it to the internal shape of the blow-mould.

Further according to the invention there is provided apparatus for manufacturing a hollow article, comprising a parison-forming mould open at the opposite ends thereof, a sectional blow-mould the parts of which are movable to and from the open and closed positions thereof and which in the closed condition thereof has an orifice in the end thereof adjacent to the parison-forming mould and which is aligned with the parison-forming mould and has a lesser cross-sectional area than that of the smallest cross-sectional dimension of the parison-forming mould, an apertured shutter located between and movable relative to the parison-forming mould and the blow-mould and operable in timed relation with the blow-mould alternately to obturate said orifice and to effect communication between the parison-forming mould and the blow-mould, a hollow core connectable with a source of pressurised fluid and reciprocable axially from a position remote from the parison-forming mould in timed relation with movements of the blow-mould and shutter, core-operating means connected with said core to effect axial movement thereof in two stages first to penetrate a slug of softened thermoplastic material located in the parison-forming mould and produce a closed end parison surrounding the core and then to cooperate with said orifice to extrude directly into the blow-mould a closed end preform having walls of lesser thickness than that of the walls of the parison, means to admit pressurised fluid through the core into the preform to expand the preform and conform it to the shape of the interior of the blow-mould, and means to retain the parison-forming mould, the shutter, and the blow-mould in substantially air-tight relation during formation of the parison and preform and to effect relative axial movement between the parison-forming mould and the blow-mould to relieve fluid pressure in the blow mould prior to opening of the blow-mould.

In order that the invention may be clearly understood one embodiment thereof will now be described, by way of example, with reference to the accompanying drawings, in which:

FIG. 1 is a diagrammatic elevation of apparatus for carrying the invention into effect, FIG. 2 illustrates, to an enlarged scale and partly in section, a part of the apparatus of FIG. 1, FIGS. 3 to 6 illustrate different stages during the forming of an article by the apparatus, FIG. 7 is a view of a portion of the apparatus shown in FIG. 2, partly in section on line VII—VII, FIG. 2, and FIG. 8 is a part section on line VIII—VIII, FIG. 7.

Referring to the drawings, the apparatus is supported on a bed or frame 1 provided with a chute 2, FIG. 1, through which formed articles can be delivered for collection. Frame members 3 support the two halves 4, 5 of a sectional blow mould for movement, in known manner by hydraulically operable actuating means 6, to and from the open and closed positions thereof. The interior of the blow mould is shaped to the configuration of the article to be formed and when closed, see FIGS. 1 and 5, the bottom of the blow mould has no opening therethrough but the top of the blow mould has an opening or orifice 7 which together with an aperture 8 formed in a shutter 9 forms an extrusion die through which softened thermoplastic material, for example polyethylene, is extruded, as described below, to form a preform 10, FIG. 5, which is thereafter expanded to conform it to the shape of the blow mould.

The shutter 9 is supported for reciprocation relative to the mould 4, 5 and to a parison-forming blow mould 11 by a piston 12 hydraulically operated in timed relation with the movements of the blow mould and with the movement of a vertically reciprocable hollow core 13 which co-operates first with the parison-forming mould 11 to form a parison 14, FIG. 4, from a slug 15 of softened thermoplastic material, FIG. 3, and then to extrude the parison directly into the blow mould to form the preform 10. The core 13 is screwed into the lower end of a tube 16 and forms therewith a shoulder 17 which co-operates with the core during the extrusion operation. Tube 17 is connected with a core-operating member 18 and with an air hose 19, FIG. 1, by which fluid, preferably air, under pressure, from a source not shown, can be admitted to the tube and thence into the axial throughway 20, FIG. 2, of the core for delivery into the preform 10. The operating member 18 is reciprocated, in known manner, by hydraulic means 21, FIG. 1, and timing mechanism, not shown, of known form, is provided to control the timed movement of core 13, shutter 9, blow mould halves 4, 5 and the admission of pressurised air to tube 16.

A non-return valve 22 co-operates with the free end of the core 13 and has a stem 23, FIG. 2, which extends axially through the throughway 20 but does not engage the sides thereof. The inner end of the stem extends beyond the inner end of the core and a spring 24 is arranged to retain the head of the valve in the closed position thereof in which it seals the throughway of the core during the formation of the parison 14 thereby.

The tube 16 has a diameter which is substantially equal to that of the aperture 8 in the shutter but the core 13 has a cross-section which varies along the direction of the axis of the core so that, as described below, when it co-operates with the opening or orifice 7 in the top of the blow mould to effect extrusion of the parison 14 into the blow mould the wall thickness of the preform 10 will vary in relation to the desired wall thickness of the end product. As shown in the drawings, the core is tapered but it may, if desired, be barrelled or otherwise suitably shaped.

Before opening the blow mould the air pressure in the bottle must be relieved and this is effected by relative axial movement between the parison-forming mould 11 and the blow mould 4, 5. If desired the blow mould may be supported for movement bodily axially of the parison-forming mould 11 but as shown in the drawings the parison-forming mould 11 is supported for axial movement relative to the closed blow mould. The parison-forming mould 11 is mounted in a bush 25, FIG. 2, carried by the cross-piece 26 on frame members 3 and is engaged by actuating means which comprise a plate 27 through which the lower end of the parison-forming mould protrudes, pillars 28 secured to plate 27 and slidable axially in bushes 29 carried by cross-pieces 26, a strong spring 30 which tends to maintain the parison-forming mould in substantially airtight relation with the shutter 9, and blow mould 4, 5, a rocking member 31 pivoted at 32 to the pillars 28 and at 33 in bearings 34, carried by the cross-piece 26, and an operating member 35, FIG. 7, which is actuated by an air cylinder 36 in timed relation with the operation of the blow mould 4, 5, the shutter 9 and the core 13.

The parison-forming mould 11 may be heated by electrical heater elements 37, FIG. 2, which are located in and extend lengthwise of the walls of the parison-forming mould to maintain the softened condition of the thermoplastic material during the formation of the parison and the extrusion of the preform.

The method of operation of the apparatus is as follows:

At the commencement of a cycle of operations the shutter 9 obturates the bottom of the parison-forming mould 11, the parison-forming mould is pressed by spring 30 into substantially airtight relation with the shutter, the blow mould 4, 5 is in the closed position thereof, FIG. 3, and a slug 15 of softened molten thermoplastic material, of predetermined quantity according to the article to be formed, is fed by any suitable means, not shown, into the heated parison-forming mould 11, FIG. 3. The core 13 is now moved axially downwards to penetrate the slug and is arrested at a predetermined position from the shutter 9 with the shoulder 17 closing the end of the parison-forming mould 11 opposite the shutter 9, FIG. 4. If desired, the leading end face of the valve 22 may be contoured to form in parison 14 a closed end 38, FIG. 4, of varying thickness to ensure that the closed end of the end product, which is a bottle as illustrated in the drawings, is of substantially uniform thickness and merges evenly into the side walls of the bottle. The depth of the parison-forming mould 11 is so chosen that the slug 15 when deposited therein, FIG. 3, does not fill the parison-forming mould and accordingly when the core has been moved to the position illustrated in FIG. 4 the slug has been penetrated by the core and formed into an annular preform 14 surrounding the core and closed at the end thereof which is engaged by the shutter 9 by a portion of softened material the thickness of which is predetermined by the distance between the leading end of the core and the shutter.

The shutter 9 is now moved to the position thereof shown in FIGS. 2, 5 and 6 in which the aperture 8 is aligned with the parison-forming mould 11 and the opening or orifice 7 in the top of the blow mould 4, 5 and effects communication therebetween. As can be seen from the drawings, the opening or orifice 7 is of lesser diameter than that of the aperture 8 and continued downward movement of the core 13 causes the parison 14 to be extruded through the opening 7 as illustrated in FIG. 2. If the preform is to be of relatively great length there is, at about the stage shown in FIG. 2, a light air pressure introduced laterally, as indicated in FIG. 5, into the preform 10 through hose 19, tube 16, and core throughway 20, the pressure being sufficient slightly to open valve 22 and to prevent the sides of the preform 10 from collapsing and becoming adhered to each other.

When the whole of the parison has been extruded to form the preform 10, FIG. 5, the shoulder 17 engages the top of the blow mould 4, 5 and movement of the core is arrested. There is now located in the blow mould a preform 10 which, because of the tapering form of the core 13, has walls of varying thickness according to the thickness required in the walls of the bottle 39, FIGS. 5 and 6, and its leading end closed by the portion 38 which is also of predetermined thickness. Next the air pressure in the preform is increased sufficiently to cause the preform to be expanded to conform it to the shape of the interior of the blow-mould and thereby to form the bottle 39, FIG. 5.

Following a short interval during which the formed bottle cools, the cylinder 36 operates member 35 to rock the member 31 about pivot 33 and so lift plate 27 and parison-forming mould 11 against the action of spring 30 thus, as illustrated in FIG. 6, forming a small gap 40 between the lower end of parison-forming mould 11 and the shutter 9 to permit the air pressure in the formed bottle 39 to be relieved.

The blow mould 4, 5 is now opened, FIG. 6, and the formed bottle is removed therefrom, for example by being blown into the chute 2, and the core is raised to the starting position thereof. Raising of the core is delayed until the blow mould halves have been disengaged from the formed bottle so that the core acts to centralise the bottle for removal from the blow mould and ensures that it does not adhere to the opening blow mould halves. Following raising of the core above the shutter the shutter is restored to the position thereof shown in FIG. 3 the actuating pressure of cylinder 36 is relieved to permit spring 30 to re-engage the lower end of parison-forming mould 11 with shutter 9, and the apparatus is now ready to repeat the cycle of operations.

When the article formed in the blow mould 4, 5 is a bottle it may, if desired, have an external screw thread formed on the neck portion thereof and this may be effected by providing a thread in a part of the opening or orifice 7 of the blow mould. Alternatively, the threads may be formed on the neck after removal of the bottle from the blow mould.

I claim:

1. The method of manufacturing a hollow article by feeding a slug of softened thermoplastic material to a parison-forming mould, penetrating the slug with a hollow core while restricting the slug against displacement in the direction of penetration of the core thereby to produce a closed end parison surrounding the core, removing said restriction and displacing the core and parison axially through an orifice of lesser cross-sectional area than that of the smallest cross-sectional dimension of the parison directly into a closed sectional blow-mould thereby to extrude into the blow-mould a closed end preform having walls of lesser thickness than that of the parison, and introducing pressurised fluid through the core to expand the preform and conform it to the internal shape of the blow-mould.

2. The method of manufacturing a hollow article by feeding a slug of softened thermoplastic material to a parison-forming mould, penetrating the slug with a hollow core the cross-sectional area of which varies from the leading to the trailing end thereof while restricting the slug against displacement in the direction of penetration of the core thereby to produce a closed end parison surrounding the core, removing said restriction and displacing the core and parison axially through an orifice of lesser cross-sectional area than the smallest cross-sectional dimension of the parison directly into a closed sectional blow-mould thereby to extrude into the blow-mould a closed end preform having walls of lesser thickness than that of the parison and which vary in thickness according to the thickness of the walls of the parison, and introducing pressurised fluid through the core to expand the preform and conform it to the interior shape of the blow-mould.

3. The method of manufacturing a hollow article by feeding a slug of softened thermoplastic material to a parison-forming mould, penetrating the slug with a hollow core while restricting the slug against displacement in the direction of penetration of the core thereby to produce a closed end parison surrounding the core, removing said restriction and displacing the core and parison axially through an orifice of lesser cross-sectional area than that of the smallest cross-sectional dimension of the parison directly into a closed sectional blow-mould thereby to extrude into the blow-mould a closed end preform having walls of lesser thickness than that of the parison, introducing pressurized fluid through the core during said extrusion to prevent the sides of the preform from collapsing and becoming adhered to each other, and following extrusion of the preform expanding the preform by pressurized fluid introduced thereinto through the core to conform the preform to the internal shape of the blow-mould.

4. The method of manufacturing a hollow article by feeding a slug of softened thermoplastic material to a heated parison-forming mould, penetrating the slug with a hollow core while restricting the slug against displacement in the direction of penetration of the core thereby to produce a closed end parison surrounding the core, removing said restriction and displacing the core and parison axially through an orifice of lesser cross-sectional area than that of the smallest cross-sectional dimension of the parison directly into a closed sectional blow-mould thereby to extrude into the blow-mould a closed end preform having walls of lesser thickness than that of the parison, and introducing pressurized fluid through the core to expand the preform and conform it to the internal shape of the blow-mould.

5. Apparatus for manufacturing a hollow article, comprising a parison-forming mould open at the opposite ends thereof, a sectional blow-mould the parts of which are movable to and from the open and closed positions thereof and which in the closed condition thereof has an orifice in the end thereof adjacent to the parison-forming mould and which is aligned with the parison-forming mould and has a lesser cross-sectional area than that of the smallest cross-sectional dimension of the parison-forming mould, an apertured shutter located between and movable relative to the parison-forming mould and the blow-mould and operable in timed relation with the blow-mould alternately to obturate said orifice and to effect communication between the parison-forming mould and the blow-mould, a hollow core connectable with a source of pressurised fluid and reciprocable axially from a position remote from the parison-forming mould in timed relation with movements of the blow-mould and shutter, core-operating means connected with said core to effect axial movement thereof in two stages first to penetrate a slug of softened thermoplastic material located in the parison-forming mould and produce a closed end parison surrounding the core and then to co-operate with said orifice to extrude directly into the blow-mould a closed end preform having walls of lesser thickness than that of the walls of the parison, means to admit pressurised fluid through the core into the preform to expand the preform and conform it to the shape of the interior of the blow-mould, and means to retain the parison-forming mould, the shutter, and the blow-mould in substantially airtight relation during formation of the parison and preform and to effect relative axial movement between the parison-forming mould and the blow-mould to relieve fluid pressure in the blow-mould prior to opening of the blow-mould.

6. Apparatus for manufacturing a hollow article, comprising a parison-forming mould open at the opposite ends thereof, a sectional blow-mould the parts of which are movable to and from the open and closed positions thereof and which in the closed condition thereof has an orifice in the end thereof adjacent to the parison-forming mould and which is aligned with the parison-forming mould and has a lesser cross-sectional area than that of the smallest cross-sectional dimension of the parison-forming mould, an apertured shutter located between and movable relative to the parison-forming mould and the blow-mould and operable in timed relation with the blow-mould alternately to obturate said orifice and to effect communication between the parison-forming mould and the blow-mould, a hollow core connectable with a source of pressurised fluid and reciprocable axially from a position remote from the parison-forming mould in timed relation with movements of the blow-mould and shutter, core-operating means connected with said core to effect axial movement thereof in two stages first to penetrate a slug of softened thermoplastic material located in the parison-forming mould and produce a closed end parison surrounding the core and then to co-operate with said orifice to extrude directly into the blow-mould a closed end preform having walls of lesser thickness than that of the walls of the parison, means to admit pressurised fluid through the core into the preform to expand the preform and conform it to the shape of the interior of the blow-mould, a parison-forming mould support biased towards the blow-mould and arranged to move the parison-forming mould axially relative to the blow-mould, retaining means operable to retain the parison-forming mould, the shutter, and the blow-mould in substantially airtight relation during formation of the parison and preform, and operating means operable to effect movement of the parison-forming mould away from the blow-mould in timed relation with the opening of the blow-mould.

7. Apparatus according to claim 6, wherein the parison-forming mould support comprises a plate carried by axially slidable pillars, the retaining means comprises a spring urging the plate towards the blow-mould, and the operating means includes a rocking member pivoted to the pillars and to a fixed pivot about the axis of which the rocking member is rocked to effect movement of the parison-forming mould away from the blow-mould.

8. Apparatus according to claim 5, including heater means embodied in the walls of the parison-forming mould to effect heating thereof during the formation of the parison and preform.

9. Apparatus according to claim 5, wherein the core is of varying cross-section considered in the direction of the axis thereof thereby to co-operate with said orifice in a manner such as to form a preform the walls of which are of varying thickness according to the thickness required in the walls of the ultimate article.

10. Apparatus according to claim 5, wherein the core includes at the leading end thereof a non-return valve movable from the closed condition thereof by fluid pressure introduced into the core.

11. Apparatus according to claim 6, including heater means embodied in the walls of the parison-forming mould to effect heating thereof during the formation of the parison and preform.

12. Apparatus according to claim 6, wherein the core is of varying cross-section considered in the direction of the axis thereof, thereby to co-operate with said orifice in a manner such as to form a preform the walls of which are of varying thickness according to the thickness required in the walls of the ultimate article.

13. Apparatus according to claim 6, wherein the core includes at the leading end thereof a non-return valve movable from the closed condition thereof by fluid pressure introduced into the core.

14. Apparatus according to claim 11, wherein the core is of varying cross-section considered in the direction of the axis thereof to co-operate with said orifice in a manner such as to form a preform the walls of which are of varying thickness according to the thickness required in the walls of the ultimate article.

15. Apparatus according to claim 14, wherein the core includes at the leading end thereof a non-return valve movable from the closed condition thereof by fluid pressure introduced into the core.

References Cited in the file of this patent
UNITED STATES PATENTS

| | | |
|---|---|---|
| 2,315,478 | Parkhurst | Mar. 30, 1943 |
| 2,317,763 | Hall | Apr. 27, 1943 |
| 2,804,654 | Sherman | Sept. 3, 1957 |
| 2,872,700 | Knowles | Feb. 10, 1959 |
| 2,914,801 | Colombo | Dec. 1, 1959 |
| 2,936,481 | Wilkalis et al. | May 17, 1960 |